United States Patent [19]

Morton

[11] Patent Number: 5,276,478
[45] Date of Patent: Jan. 4, 1994

[54] METHOD AND APPARATUS FOR OPTIMIZING DEPTH IMAGES BY ADJUSTING PRINT SPACING

[75] Inventor: Roger A. Morton, Penfield, N.Y.

[73] Assignee: Eastman Kodak Company, Rochester, N.Y.

[21] Appl. No.: 885,705

[22] Filed: May 19, 1992

[51] Int. Cl.⁵ .............................................. G03B 27/32
[52] U.S. Cl. .......................................... 355/22; 355/77; 354/112
[58] Field of Search .............. 355/22, 77; 354/112–115; 358/89; 430/394

[56] References Cited

U.S. PATENT DOCUMENTS

| | | | |
|---|---|---|---|
| 3,854,670 | 12/1974 | Bertolazzi | 242/67.4 |
| 4,033,059 | 7/1977 | Hutton et al. | 40/137 |
| 4,132,468 | 1/1979 | Lo et al. | 354/115 X |
| 4,170,415 | 10/1979 | Lemeshewsky et al. | 355/22 |
| 4,417,784 | 11/1983 | Knop et al. | 350/162.19 |
| 4,499,126 | 2/1985 | Suzuki et al. | 428/13 |
| 4,708,920 | 11/1987 | Orensteen et al. | 430/11 |
| 4,711,690 | 12/1987 | Haghiri-Tehrani | 156/309.6 |
| 4,765,656 | 8/1988 | Becker et al. | 283/70 |
| 4,766,026 | 8/1988 | Lass et al. | 428/203 |
| 4,773,677 | 9/1988 | Plasse | 283/77 |
| 4,814,826 | 3/1989 | Fritsch | 355/22 |
| 4,827,282 | 5/1989 | Ritchie | 346/1.1 |
| 4,845,520 | 7/1989 | Mori | 346/76 PH |
| 4,847,184 | 7/1989 | Taniguchi et al. | 430/346 |
| 4,855,840 | 8/1989 | Kimura et al. | 358/296 |
| 4,869,946 | 9/1989 | Clay | 428/167 |
| 4,890,120 | 12/1989 | Sasaki et al. | 346/76 PH |
| 4,894,110 | 1/1990 | Lass et al. | 156/282.3 |
| 4,911,478 | 3/1990 | Oshikoshi et al. | 283/109 |
| 4,920,039 | 4/1990 | Fotland et al. | 430/394 |
| 4,928,996 | 5/1990 | Oshikoshi et al. | 283/109 |
| 4,932,385 | 6/1990 | Mancuso | 283/91 |
| 4,935,335 | 6/1990 | Fotland | 430/324 |
| 4,945,407 | 7/1990 | Winnek | 358/88 |
| 4,960,336 | 10/1990 | Brooks et al. | 400/61 |
| 4,963,885 | 10/1990 | Yasunaga et al. | 346/76 PH |
| 4,968,064 | 11/1990 | Manusco | 283/91 |
| 4,970,531 | 11/1990 | Shimizu et al. | 346/76 DH |
| 4,983,054 | 1/1991 | Nishiura | 400/120 |
| 4,983,989 | 1/1991 | Komuro et al. | 346/1.1 |
| 4,990,930 | 2/1991 | Ludden et al. | 346/1.1 |
| 4,994,822 | 2/1991 | Caine | 346/76 PH |
| 5,012,258 | 4/1991 | Sasaki | 346/1.1 |
| 5,015,552 | 5/1991 | Tamura et al. | 430/138 |
| 5,023,626 | 6/1991 | Kawamura | 346/33 TP |
| 5,028,950 | 7/1991 | Fritsch | 355/23 |
| 5,113,213 | 5/1992 | Sandor et al. | 355/22 |

FOREIGN PATENT DOCUMENTS 2092330  8/1982  United Kingdom .

Primary Examiner—D. Rutledge
Attorney, Agent, or Firm—Edward Dugas

[57] ABSTRACT

A method and apparatus for producing the image elements of a lenticular image. The lenticular image includes a plurality of composite images of the same scene where each composite image includes image lines. The image lines of one composite view are interleaved with the image lines forming the other composite images to create image line sets. The sets include one image line from each composite image. The sets of image lines are aligned with the lenticules of a lenticular overlay by adjusting the spacing between the image line sets, so that the sets are in optimum alignment or phase relationship with each lenticule of the lenticular overlay. The spacing between image lines and/or between scan lines and/or image line sets can be adjusted to correct phase errors. The scan lines are printed in a fast scan direction of a printer in alignment with the lenticules.

33 Claims, 6 Drawing Sheets

METHOD AND APPARATUS FOR OPTIMIZING DEPTH IMAGES BY ADJUSTING PRINT SPACING

CROSS REFERENCES TO RELATED APPLICATIONS

This application is related to U.S. application entitled Electronically Interpolated Integral Photography System having U.S. Ser. No. 07/722,713 incorporated by reference herein.

BACKGROUND OF THE INVENTION

1. Field of the Invention

The present invention is directed to creating depth images which provide a visual impression of three-dimensional images using lenticular image forming techniques and, more particularly, to using electronic printing techniques where image forming scan lines are oriented in a printer fast scan direction, aligned with lenticules of a lenticular overlay and optimized for viewing distance and view point by adjusting distances between the scan lines, the image lines which comprise the scan lines and the sets of image lines formed under each lenticule, thereby producing improved quality lenticular depth images.

2. Description of the Related Art

Lenticular arrays or overlays are a known means to give images the appearance of depth. A lenticular image is created using a transparent upper layer having narrow parallel lenticules (half cylindrical lenses) on the outer surface and an image containing substrate or lower layer which projects images through the lenticules. The two layers form a lenticular system wherein each image is selectively visible as a function of the angle from which the system is viewed. If the depth image is a composite picture made by bringing together into a single composition a number of different parts of a scene viewed from different angles, each eye of a viewer will see different elements and the viewer will interpret the net result as depth of field. The viewer may also move his head with respect to the image thereby observing other views with each eye and enhancing the sense of depth. Each lenticule is associated with a plurality of image lines or an image line set and the viewer is supposed to see only one image line (or view slice) of each set with each eye for each lenticule. It is imperative that the line image sets be registered accurately with the lenticules, so that the proper picture is formed when the assembly is viewed. The precision required to create the registration necessary for a clear depth image using this technology has been a major obstacle in bringing this concept to market at a reasonable cost. A second major impediment to consumer acceptance is the inability of these systems to provide the desired depth effect when the viewer is positioned outside of a very narrow distance envelope from the image combined with the prior art systems inability to accurately regulate the location of the viewing envelope.

SUMMARY OF THE INVENTION

It is an object of the present invention to align a line image printing direction with a long axis of the half cylindrical lenses forming a lenticular overlay.

It is also an object of the present invention to align print scan lines, image lines, which can be one or more scan lines, and sets of image lines with lenticules of the lenticular overlay by adjusting spacing therebetween using fractions of a scan line spacing where a scanline spacing consists of many of the smallest movement steps an image recording or printing device can take.

It is another object of the present invention to write sets of image lines at the pitch of the lenticular material.

It is still another object of the present invention to adjust the phase relationship between lenticules and image line sets to optimize viewing distance and location.

It is a further object of the present invention to print extra scan lines to align image sets with the lenticules.

It is also an object of the present invention to correct for phase errors between image sets and lenticules by varying the space between image lines across an image line set or between image line sets.

It is another object of the present invention to provide a method for compensating for mismatch between lenticules and image lines in a lenticular based imaging system by varying the width of non-image areas between image lines.

It is an object of the present invention to provide a method for producing three-dimensional images on a media, comprised of a layer having a variable reflectance or transmission and a lenticular array or overlay, via a radiation beam image-wise exposure using a scan line rate equal to a function of the lenticule spacing and simultaneously correcting accumulating lenticule/scan alignment errors by varying the width of an unexposed space between scan lines, between image lines and between image line sets of adjacent lenticules.

The above objects can be attained by an invention that includes a depth image, an apparatus for creating the depth image and a method for fixing the depth image in a media, including a radiation responsive image media and a lenticular lens array covering the viewing side of the media. The image media is exposed using printer scan lines oriented in parallel with the lenticules of the lenticular array to create line images for each lenticule of the array. The scan lines are also printed in a fast scan direction of the printer. Each image line is a view slice of a composite image or view. The number of image lines interleaved under each lenticule is a function which results in enough image lines being positioned under each lenticule, so that each eye of a viewer within a range of viewing distances will see a different line image or view slice from each lenticule. The multiple image lines per lenticule that are seen provide a range of cooperating images for each eye which are interpreted by a viewer as depth of field to provide a three-dimensional or depth effect. Scan or lenticular array irregularities, phase alignment of lenticules with image line sets and phase error within the sets are compensated for by adjusting the unexposed space between scan lines, image lines, and image line sets for adjoining or adjacent lenticules.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
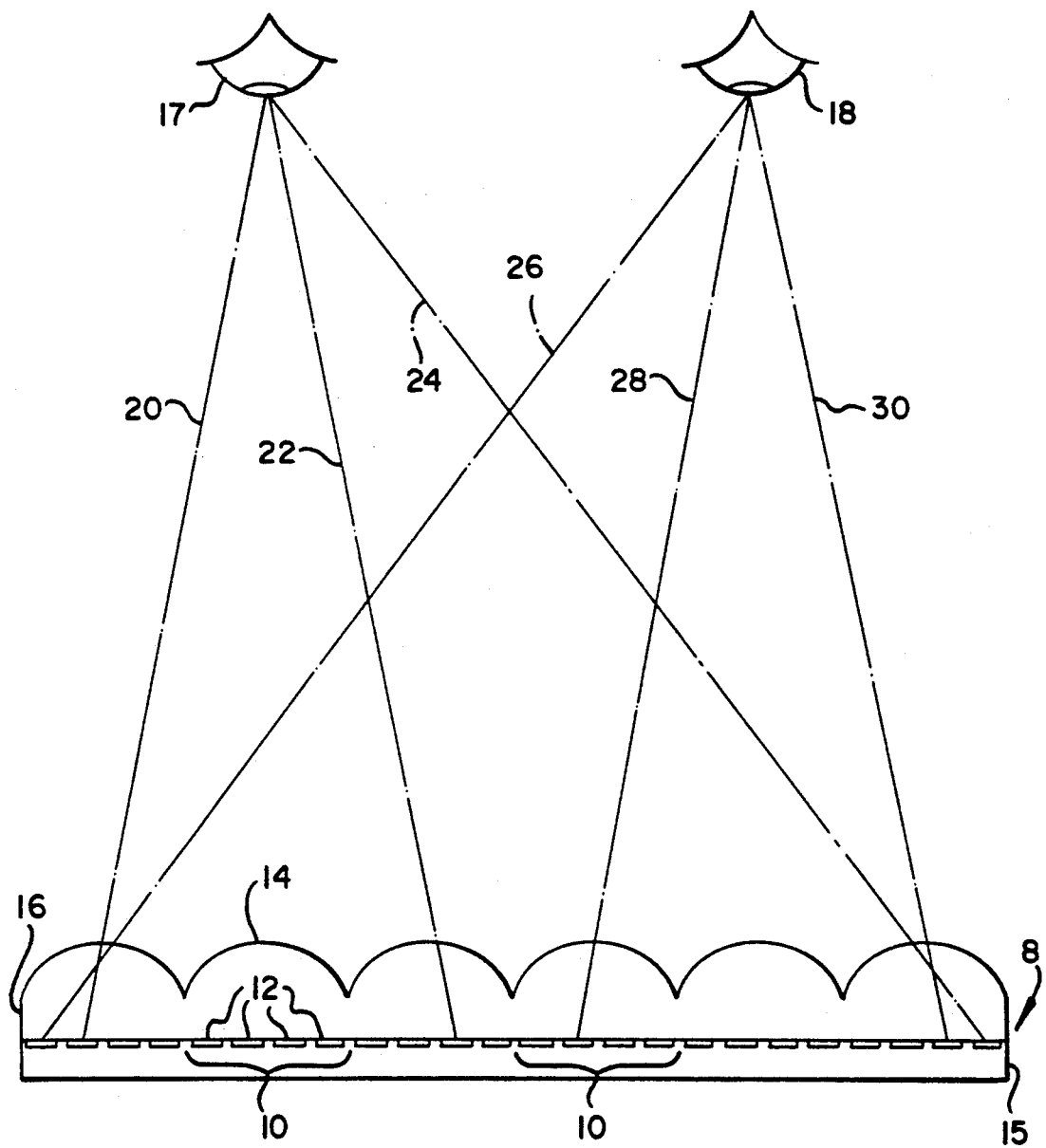
FIG. 1 illustrates the operation of a lenticular imaging system.

FIG. 1 illustrates a depth image system 8 created using lenticular technology and incorporating some of the teachings of the present invention. The basic images are comprised of a plurality of sets 10 of image lines 12 for each lenticule 14. When viewed, one image line 12 of each set 10 is seen by each eye 17 and 18 and the observed image lines (view slices) merge to create a complete scene. The scene observed by each eye 17 and 18 is different as a function of the viewing angle and this can be interpreted as depth by the observer, if the views from each angle are different perspectives of the same scene. The image system 8 includes a recorded image media 15, such as a conventional photographic print media, and a conventional lenticular lens assembly or overlay 16 that is preferably in the form of a lenticular sheet interposed between the viewer (the eyes 17 and 18) and the recorded image media 15. The image recording media 15 may be a separate substrate such as a developed photographic film bonded to the overlay 16 or simply the flat rear surface of the overlay 16 including a recording emulsion therein. However, it must be appreciated that for a single eyed version, horizontal motion of the eye will provide the same depth or look around effect. The eyes 17 and 18 see the image via rays, for example, rays 20–30 through the lenticules 14 of the overlay 16 as a series of simultaneous image lines or view slices. Eye 17 sees image lines or view slices via rays 20–24 and combines the view slices into a composite, single first view while eye 18 sees image lines or view slices via rays 26–30 and combines the view slices into a composite, single second view. The different scenes provided by the first and second views provides the depth perspective.

Figure 2:
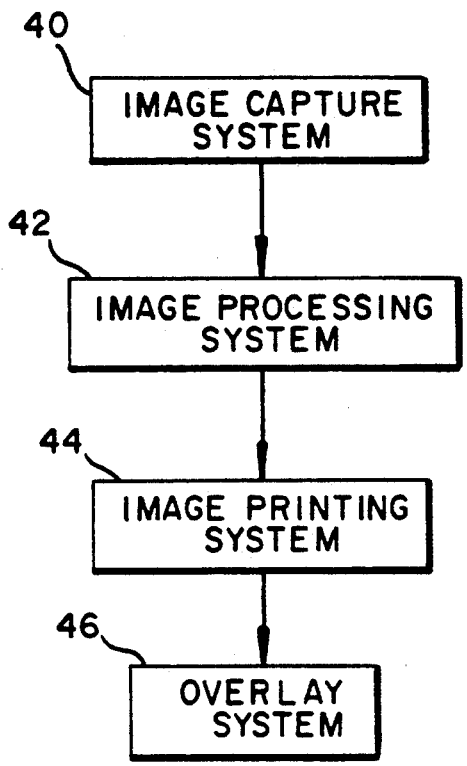
FIG. 2 depicts the systems and operations required to produce a depth image in accordance With the present invention.

A lenticular image such as produced by the system 8 of FIG. 1 can be created using optical as well as electronic methods. In the preferred approach, as illustrated in FIG. 2, an image capture system 40 captures a number of images or views of a scene from different angles or perspectives. The image capture system 40 digitizes the views and passes the views to an image processing system 42. The system 40 can be a conventional single camera or a set of conventional cameras capturing images electronically or using film. If a film system is used a conventional film scanner converts the film images into electronic images. The image processing system 42 combines the images into a composite print file in which slices of the captured views are interleaved. The composite print file is provided to an image printing system 44. A detailed description of the process of creating a suitable print file from several digital images is discussed in the related application previously mentioned. The image processing system 42 is preferably a workstation type computer, such as a Sun workstation. The image printing system 44 can be one of a number of different conventional printing mechanisms such as a thermal printer, a laser printer, a cathode ray tube printer or an optical printer. As will be understood from the discussion herein, a printer that has the ability to adjust the center to center distance between printed lines, typically called printer scan lines, is preferred. A preferred optical printer with this capability is the LVT printer model 1620B available from Eastern Kodak Co. The print 15 produced by the image printing system 44 is provided to an overlay system 46 which att aches the lenticular overlay 16 to the print 15. The overlay system 46 can be automated or can be a technician bonding the overlay 16 to the print 15 using a conventional bonding technique such as gluing.

Figure 3A:
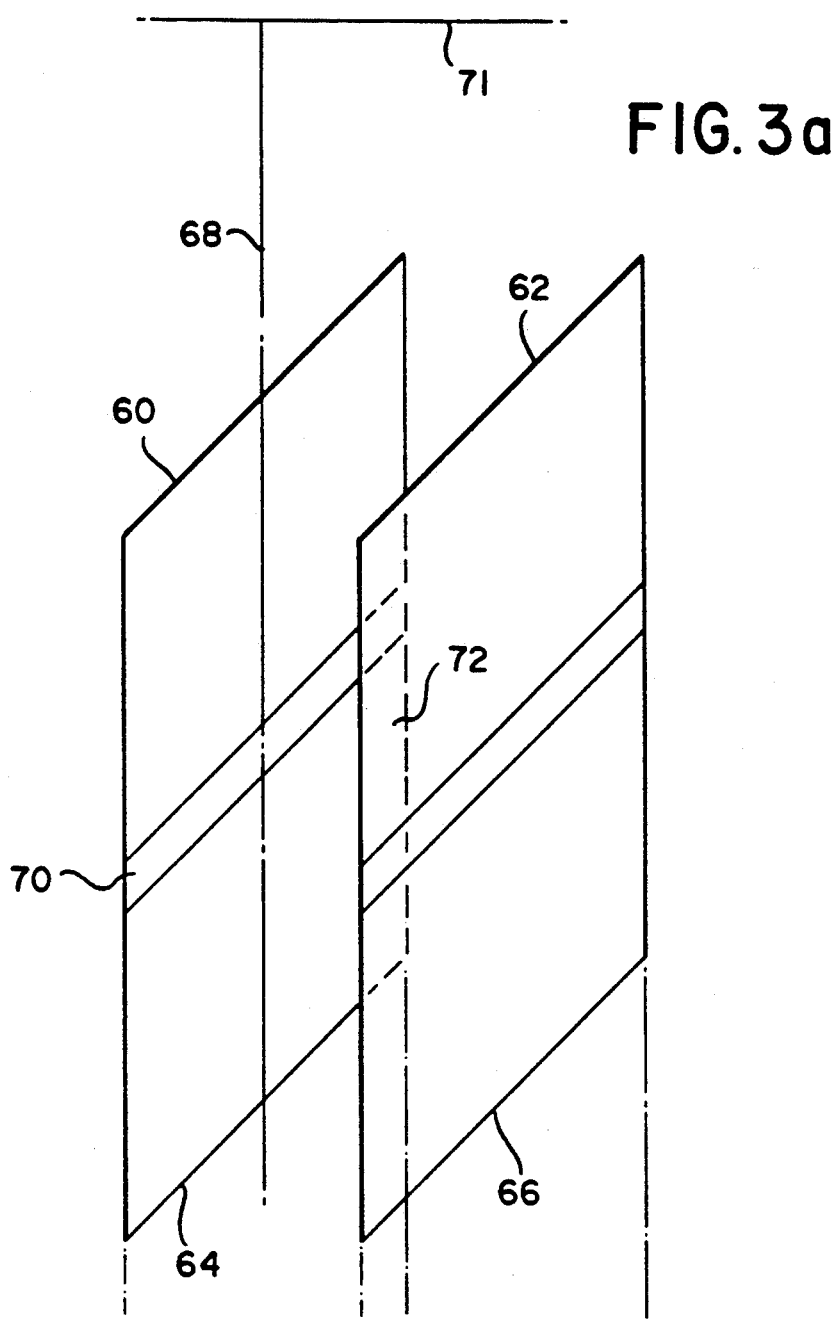
FIGS. 3a and 3b illustrate characteristics of pixels and printer scan lines when a typical photographic print is being printed by a light valve aperture type printer.
Figure 3B:
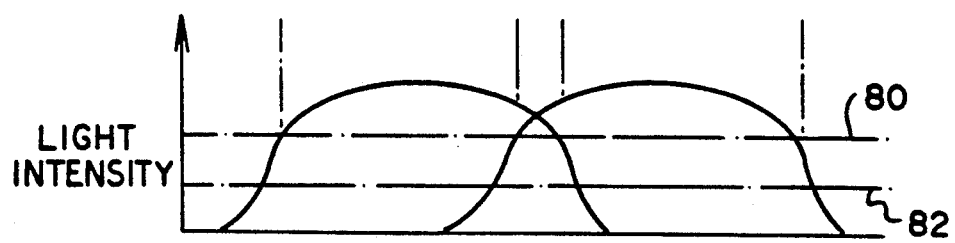

FIG. 3a illustrates an enlarged and exaggerated view of a section of a printed image typically produced by the preferred printer when the printed image is designed for direct viewing, such as in conventional photographic print. Direct viewing is viewing a photograph without any lens system interposed between the print and the viewer such as when a person looks at a snap shot print held in the hand. Assuming that each of the printed pixels 60–66 is diamond shaped (though it will be appreciated that the specific shape and intensity profile of the pixels is determined by the optical characteristics of the printer) and is produced by positioning a print media under an optical exposure system and transmitting appropriately colored light through a diamond shaped aperture. To create the next pixel, the print media, attached to a revolving drum in the preferred printer, is moved along a scan line 68 or fast scan direction to another position at which another exposure occurs. To print the next or adjacent scan line the printer head is moved a plural number of printer steps to the next scan line position in a slow scan direction 71 perpendicular to the fast scan direction and across the revolving drum. To create a smooth photographic print image for direct viewing, the pixels are designed to overlap in both the scan line direction, as shown by overlap area 70, and in the slow scan direction 71 perpendicular to the fast scan direction, as shown by overlap area 72. When a print printed using the conventional overlap pixel spacing is viewed through a lenticular overlay, that is, not viewed directly, the pixels in adjacent scan lines from different views in the slow scan direction 71 cause an effect called adjacent scan line modulation which reduces the quality of the images created by the lenticular overlay. To reduce this effect it is desirable to space the scan lines of different views or image lines apart by a distance such that the pixels do not significantly overlap, that is, the overlap 72 disappears. FIG. 3a shows the edges of the pixels to be sharp when in fact, as illustrated in FIG. 3b, the edges are not sharp because of optical diffraction effects in the printer. The edge of each pixel is commonly designated by the printer manufacturer as some percentage of full intensity as depicted by the dashed line 80 of FIG. 3b. To remove any overlap it is necessary to space the pixels far enough apart in the slow scan direction 71, so that the light intensity has fallen below a predetermined threshold, such as an activation threshold 82, of the print media, as illustrated by dashed line. The activation threshold is the lowest light intensity level at which a chemical charge will occur in the media due to radiation exposure. This activation threshold 82 varies from media to media requiring that the spacing between scan lines of adjacent image lines either be variable or that the spacing be some arbitrarily large distance sufficient to prevent overlap. This spacing, as will be discussed later is accomplished by adjusting the number of steps or the distance moved between scan lines, in the slow scan direction 71, by the printer head.

Figure 4A:
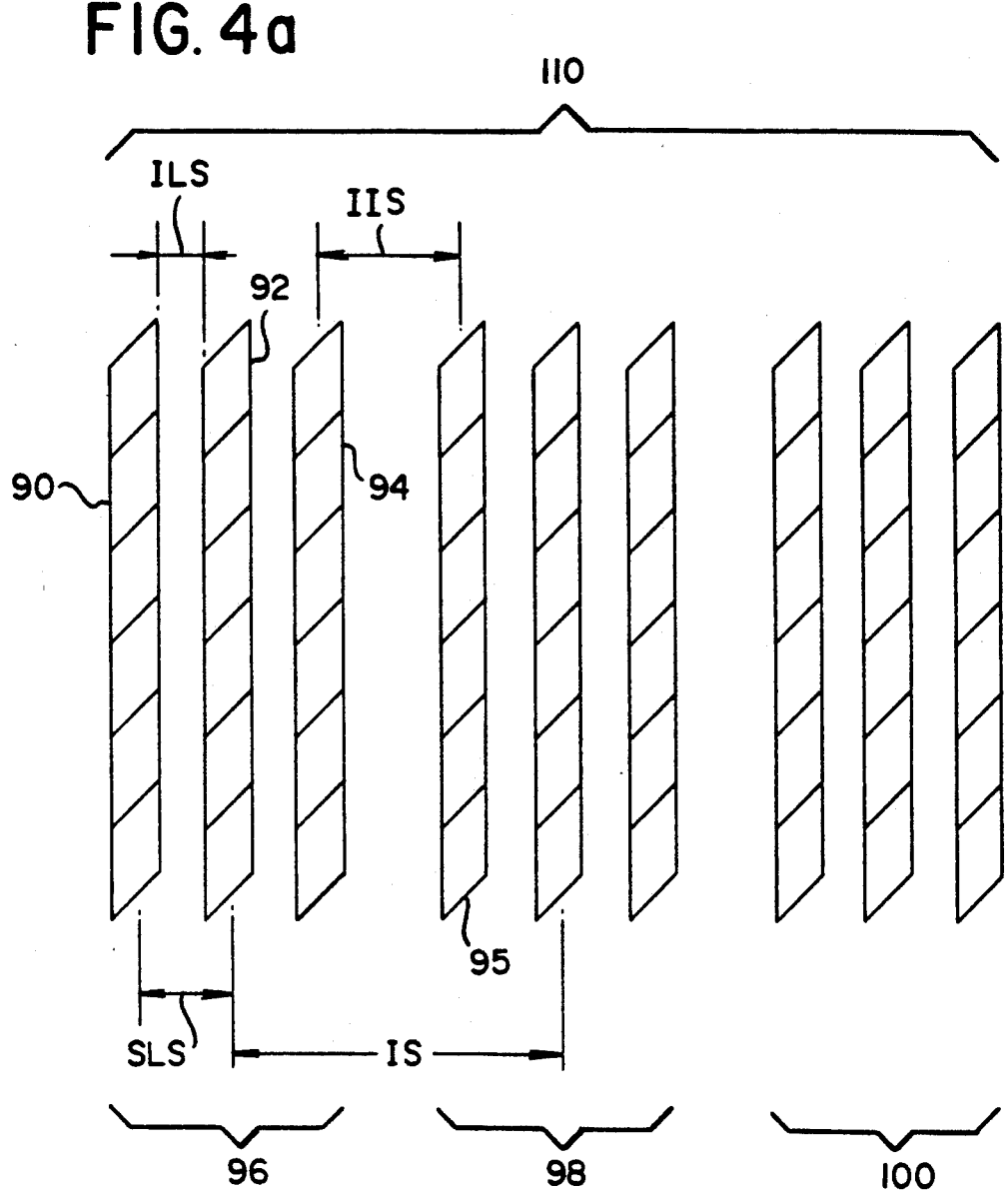
FIGS. 4a, 4b and 5 depict characteristics of depth images in accordance with the present invention.
Figure 4B:
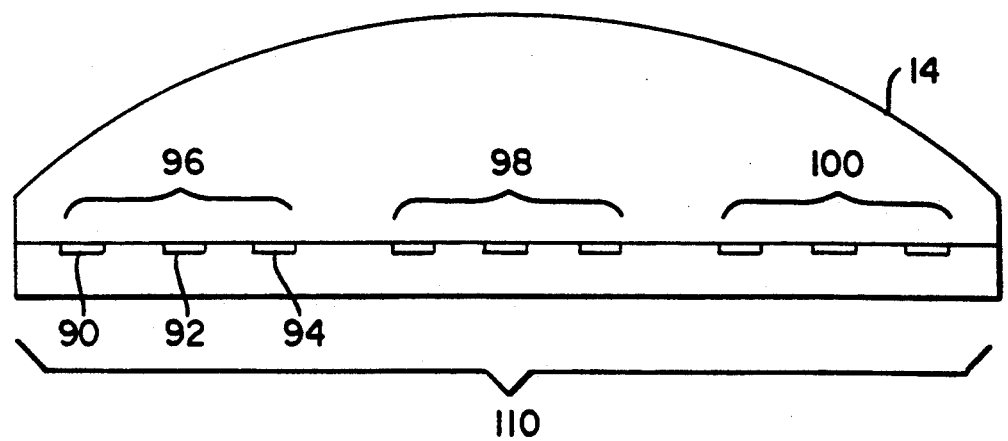
Figure 5:
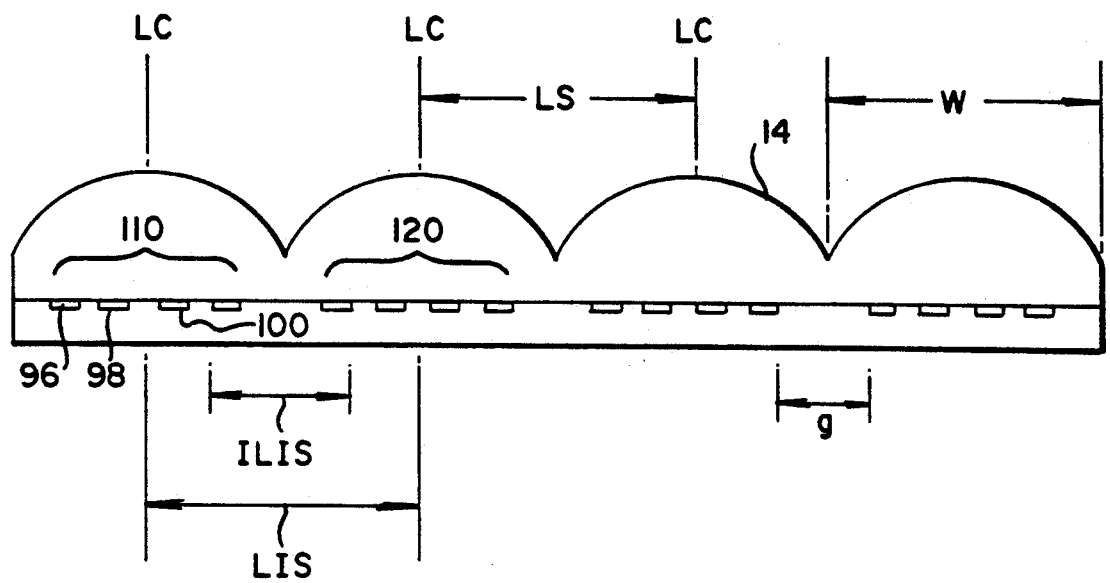

FIGS. 4a and 4b illustrate scan lines 90 and 92 separated by an interline space (ILS) that takes into account a desired alignment of the edges of the pixels as defined by the activation threshold or some other desired overlap threshold if pixel overlap is desired. The ILS can result in a center to center scan line spacing (SLS) which is larger than that found on the typical photographic print. If the scan lines 90 and 92 are in the same image line, it is desirable that the ILS and SLS be sufficient to provide an overlap area, such as area 72, and therefore sufficient to maintain an exposure level from line to line matching that of the original image. For example, aligning the 50% intensity levels of pixels of adjacent scan lines in the same image line would produce the desired effect. Similarly, if the scan lines are in different image lines the spacing SLS should again align to the 50% level or abut the activation thresholds of the pixels depending on the intensity profile of the spot. Plural scan lines, such as scan lines 90-94, can be used to create an image line, such as image line 96. The image lines 96 and 98 include an interimage space (IIS). The interimage space, IIS, is the center to center distance between adjacent scan lines in adjacent line images as shown in FIG. 4a. The IIS should be just sufficient to have the activation threshold edges of the pixels of the scan lines 94 and 95 abutting each other. However, in practice it has been found that apparent depth image quality can be higher when a very small dark space exists between the image lines. This results in the spacing IIS between image lines 96 and 98 being greater than that of the spacing ILS between scan lines. The center to center image line spacing (IS), when plural scan lines create an image line and the scan lines are printed at a constant spacing and even when a single scan line is an image line, is greater than SLS. The required spacing between image lines can be created by adjusting IS when an image line and a scan line are the same and by adjusting IIS when plural scan lines create an image line. Several scan lines 96-100 create an image line set 110 as illustrated in FIG. 4b. As illustrated in FIG. 5 each lenticule has a lenticule center LC and a pitch (for example, center to center distance) of W, which, when the pitch of all lenticules is the same, results in a uniform center to center lenticule spacing of W. The image line sets 110 and 120 can include a guard band g which is a space corresponding to an interlenticule image space (ILIS) designed to enhance the composite image, so that lines can be grouped together in alignment under each lenticule. The ILIS, as will is discussed later herein, is variable and can be varied by changing the number of steps which the printer head moves between fast scan line direction exposures. A center to center lenticular image spacing (LIS), as will be discussed in more detail later, need not be identical to the lenticule spacing (LS).

Figure 6:
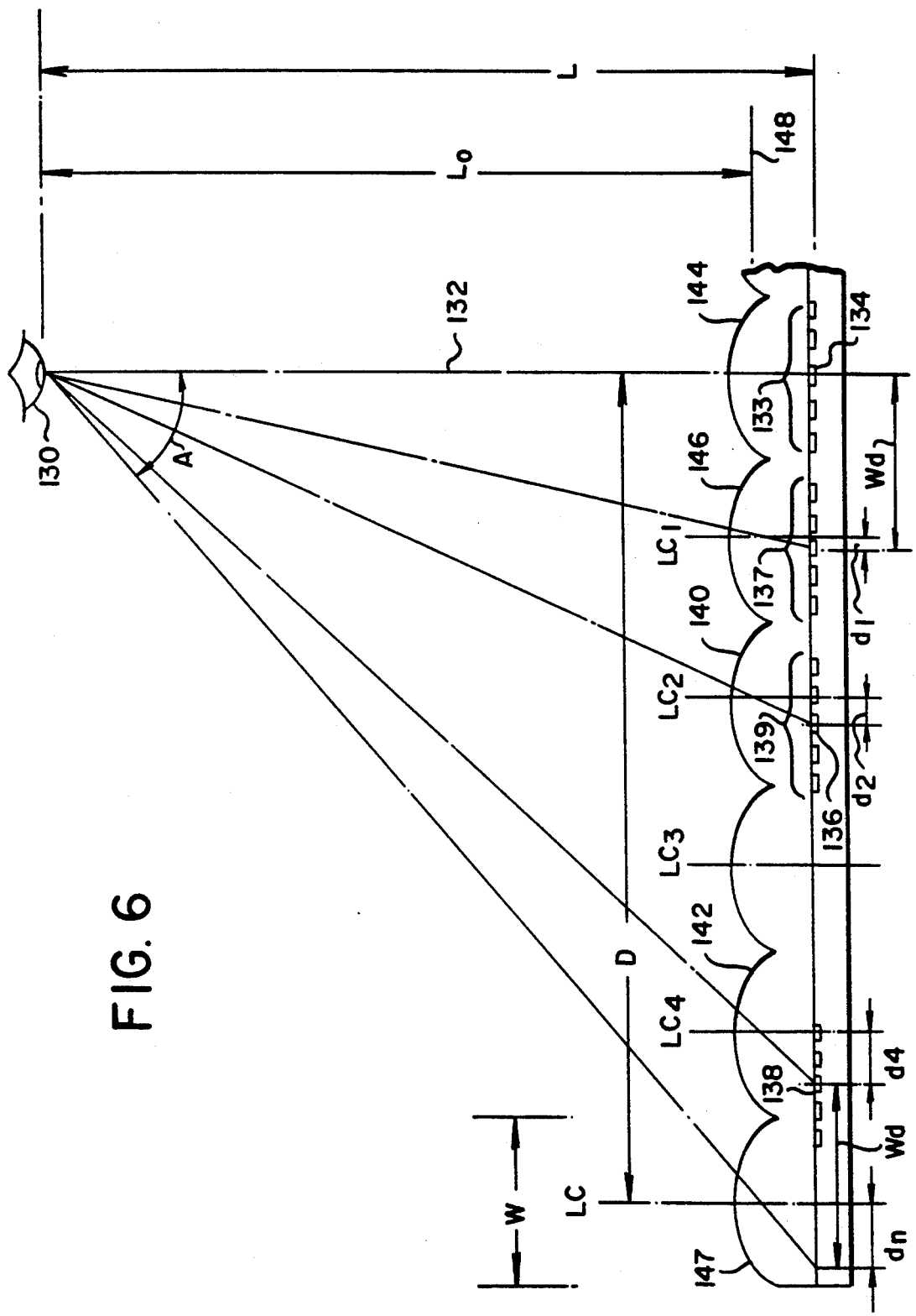
FIG. 6 illustrates phase relationship changes between lenticules and image line sets in accordance with the present invention.

A normal viewing distance L at which the lenticular depth image is designed to be viewed is illustrated as unrealistically short in FIG. 6 to emphasize the angular changes as the eye views adjoining lenticules. It will be appreciated that while L is the nominal viewing distance, the actual viewing distance covers a wide range. FIG. 6 also shows an eye 130 positioned at a normal position for viewing the print which is approximately in the center of the print, although the viewing position in practice covers a large range. When the eye 130 is positioned at distance L, the on axis view via ray 132 which passes through the center LC of the center lenticule of the print provides the eye with one view slice produced by one image line from a set 133 of image lines covered by lenticule 144. When corresponding image lines 136 and 138 from the same scene are viewed by eye 130 the viewing angle for each image line is different. Each observable image line of the same scene is positioned differently relative to the lenticule center LC of its lenticule as shown in the FIG. 6. That is, each set of image lines shifts relative to the center LC as the view slice or image line seen moves away from the on axis view slice for image line 134. The phase relationship between the lenticules and the image line sets changes as the distance off axis changes. The position of the center of line image 136 is off axis by a distance $d_2$, from the center LC of lenticule 140 and the position of the corresponding image line 138 is off axis by a distance $d_4$ from the center LC of lenticule 142. The distance $d_4$ is greater than the distance $d_2$. That is, each image line has a different position relationship to its related lenticule center LC, so that at the nominal viewing distance L, the viewer sees the corresponding image line from the image line sets from all lenticules.

As can be seen the effective optical lenticule pitch changes as the angle at which the image is viewed changes. For example, if the lenticule pitch is W the effective optical center for the image line set for lenticule 140 is $W+d_2-d_1$ while the effective optical pitch for lenticule 142 which is two lenticule spacings off center is $W+d_4-d_3$. If the distance over which the image line set must shift is d (the off center distance) and the number of lenticules from the on axis position (in FIG. 6 lenticule 144) is n then the position of an observable image line under one lenticule to that of an observable image line of the same scene n lenticules away is, to a first approximation, $$nW+nd \qquad (1)$$

In general, d is defined as $(d_i-d_{i+n})/n$, that is, the average shift over n lenticules in the position of observable image lines of the same scene. The genera equation for the effective pitch (or distance) between image lines from the same scene between adjacent lenticules is $Wd=W+d_m$ when $d_m$ is the displacement for the with lenticule from the on axis viewing condition. Adding d to W adjusts the phase relationship of the image line sets to the lenticules. In FIG. 6, m=2 and for lenticule 140 n=2 resulting in $2W+d_2$ and for lenticule 142 n=4 resulting in $4W+d_4$. The distance d for the most off axis lenticule 147 can be determined experimentally by laying down test lines of various spacing and identifying those that fall within view at the ideal view position or it can be computed by knowing the desired viewing distance L, the distance $L_o$ from the eye 130 to the line 148, which is a line through the optical axes of the lenticules, and the distance D between the center LC of the lenticule 144 on the on axis line 132 and the center LC of the lenticule 147 using conventional ray tracing techniques since the angle A is known using knowledge of the refractive indices of the lenticular material and the optical equations of the material and the media. When the non-offset or non-phase adjusted center to center image line set distance is set equal to W, the width of the lenticule, then:

$$LIS_n = W + d \qquad (2)$$

where $d = d_n/n$. When the non-offset adjusted distance between adjacent image lines in adjacent image line sets is equal to g, where g is the guard strip between image line sets, then $$ILIS_n = g \qquad (3)$$

In equation 3 when an image line is a single scan line and/or when adjacent scan lines in adjacent image line sets have a guard distance g between them:

$$SLS_n = g \qquad (4)$$

That is, the adjacent scan lines in adjacent lenticule images must be separated from each other by the center to center distance g.

As previously mentioned, in a printer such as the preferred printer, the print media is attached to a revolving drum, the fast scan direction is the direction the drum is revolving, the slow scan direction is across the drum and is the direction the print head moves with respect to the drum. The distance between adjacent scan lines, in the slow scan direction, can be specified by the number of steps that the optical head moves in the slow scan direction. The smallest step size ss that preferred printer can take is 0.0004 inches. In some designs this smallest step is called a microstep. By dividing this step distance into the results of the above equations the number of steps between the lines which maintains the desired guard band and adjusts for the phase relationship offset can be obtained to control the printer. In practice the number of steps to the next scan line from the current print head position is specified in association with the pixel values that are to be printed. The number of steps can be provided in a separate file with entries corresponding to the lines or as part of the pixel data. In the example of FIG. 6, the number of steps between left most scan line for the image line set 137 for lenticule 146 and the right most scan line for the image line set 139 for lenticule 140 is g/ss. This value is provided to the printer in association with the pixel values for the right most scan line of set 139 when the print head is positioned at the left most scan line of set 137. The aspect of the invention discussed above is the technique for electronically writing images in the direction and in phase alignment with the lenticular material for a desired viewing distance and position, and specifically addresses the adjustment of the phase of sets of image lines where the sets are printed at the desired pitch. As previously discussed, images are comprised of a number of image lines under any given lenticule. The number of image lines under a lenticule is typically in the range of 7 to 30 depending on the scene or viewing conditions of the lenticule image as well as the value of W which is in the range 1/20 to 1/300 of an inch. One technique for achieving a high quality image is to write the image lines behind each lenticule such that the pitch between one view on a lenticule to the related view of the image line set on the next lenticule is exactly $W + d_n$ for each view set of line images. This can be achieved by writing all images lines as one or more scan lines on the imaging material parallel in the direction of the lenticules, such that the image lines are aligned with the fast scan direction and are written with a constant distance therebetween. The technique of writing scan lines in the fast scan direction reduces the bandwidth required for writing as opposed to writing in other directions and simplifies the image processing because each line image corresponds to one or more complete scan lines. To further consider the issue of lenticular position in alignment with the individual scan lines of the image, assume each view slice is represented or produced by a single scan line, that is, an image line comprises a single scan line. When the number of image lines under a lenticule is p ideally the spacing between every image line is W/p when no guard strip is present between image line sets and (W−g)/p when the guard strip is placed between image line sets. However, the image recording device may, due to constraints inherent in its design, be able to write only at a line spacing of S which will result in an accumulated image line/lenticule alignment error. The accumulated alignment, spacing or phase error over N lenticules is:

$$(W/p - S) p \cdot N \qquad (5)$$

or, in the case of a guard band of width equal to an exact multiple of S, $$\left(\frac{(W-g)}{p} - S\right) p \cdot N \qquad (6)$$

To achieve a good image quality, each image line must be accurately positioned with respect to the corresponding lenticule. To achieve the desired image line spacing, and ensure that there is no phase error accumulation across the image and because the fundamental step size of the printing device will not generally match the ideal image line spacing, it is necessary to accurately control the accumulation of phase error.

The problems created by the phase error can be overcome in a number of ways. One way is the use of the stepping capability of the preferred printer to accurately position the image line spacing. For example, if the smallest printer step size is the distance ss, then:

$$n_s = W/ss \qquad (7)$$

where $n_s$ is the number of steps per lenticule pitch and or $$n_s = (W - g)/ss \qquad (8)$$

There is no guarantee in the above equations that the value of $n_s$ is an integer. It is impossible for a printer, such as the preferred printer, to achieve a fractional step which is smaller than the smallest step the printer can make. However, ideally, as noted above, there may be a noninteger number of steps involved in going from one scan line to the next which may create the need for something equivalent to a fractional step. Because of the necessity to have an integer number of steps between each scan line (this is because by definition a step is defined as the smallest resolvable movement distance possible by the printer) and because the value of $n_s$ may be a non-integer, one of two approaches must be used.

The first approach ensures that when $n_s$ is not an integer, an integer value is approximated by changing the value of $n_s$ to a whole number. This is done between the first two image lines under a lenticule by increasing the spacing IS in a slow scan direction to the next integer number, i.e., the next integer number greater than $n_s$. The spacing between the second and third image lines under a lenticule is truncated (or decreased) to the next integer number, i.e., the integer number less than $n_s$. This alternating process of rounding up and rounding down of the ideal number of steps is repeated for succeeding image lines, so that the accumulated residual error is a minimum. The technique maintains a minimal residual error across the image line set, but it introduces unequal image line spacings which can vary by one step.

Another approach maintains a constant image line spacing across each lenticule and corrects the accumulated phase error by varying the space between adjacent image lines at the boundary between adjacent image line sets (lenticules). Thus, the space ILIS in the gap between lenticules is used to eliminate an accumulated mismatch or phase error by creating a variable width unexposed area. In the case involving a guard region g between lenticules the width of the guard region would vary. The advantage of this approach is that the distribution of image line positions within each lenticule is the same. It will be appreciated that if the lenticule lens introduces a variable magnification across its width, the optimal distribution of line position is not necessarily equal spaced. Instead the spacing can compensate for the lenticular non-linearities. If $n_s \cdot p$ steps are required to exactly cover the effective viewing portion of a lenticule and the spacing between each image line is an integer value of $N_S$ steps, where $N_S$ is the closest integer value less than $n_s$, then the width of the space ILIS between lenticules, is given by the following equation:

$$ILIS = n_s p - p \cdot N_s = p(n_s - N_s) \qquad (9)$$

or $$ILIS = (n_s p - p \cdot N_s + g) \qquad (10)$$

Because ILIS is generally a non-integer multiple of ss, the actual integer value of the number of steps in the gap between image line sets for pairs of lenticules can be varied using the alternating rounding technique previously discussed to remove an accumulated error from lenticule to lenticule.

The guard band g is used to increase the size of the gap between lenticules to ensure that the image lines are distributed only over the useful field of view of each lenticule.

Figure 7:
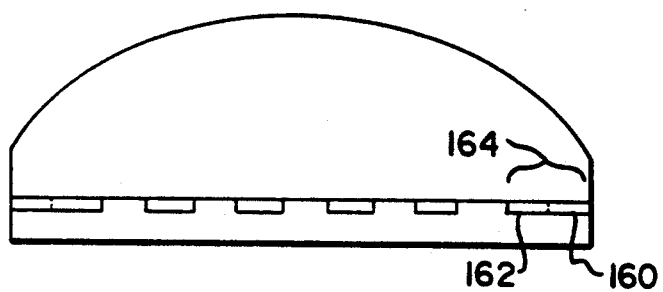
FIG. 7 depicts multiple scan line printing in accordance with the present invention.

The practical line spacing of an image writer may yield a number of lines across a lenticule which are substantially greater than the available number of views. That is, the number of available lines divided by number of views may not result in an integer. In this case, more than one scan line can be used for some image lines to distribute the image across the lenticule to occupy all the available number of lines, thereby matching the writing and lenticular pitches. This is illustrated in FIG. 7 where two scan lines 160 and 162 are used to create a single image line 164.

Figure 8:
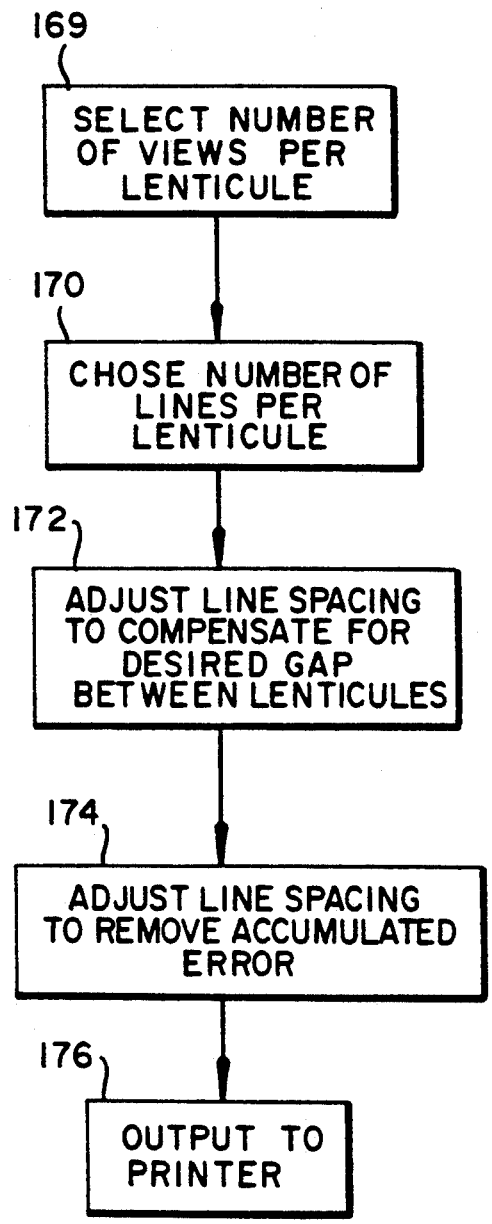
FIG. 8 is a flowchart of the steps of the process of the present invention.

The process of adjusting the line spacing in accordance with the present invention is illustrated in FIG. 8. The composite print file is obtained (not shown) using the process described in the related application. This print file comprises a list of scan lines each with an assumed photographic scan line spacing. Each scan line includes plural pixel values for representing the color of the pixels. The line spacing of all image lines is completed from the number of views per lenticule, 169, then the number of lines per lenticule is selected 170. Line spacing is selected to provide a desired gap between lenticules to ensure that the lines associated with one lenticule can be grouped and correctly positioned under the lenticule. When an image line is comprised of a single scan line this requires SLS to be adjusted otherwise IIS is adjusted. This adjustment requires that the number of steps to the first scan line in each image line from the current position, which in actual practice is the last scan line in a previously scanned image line, be increased above the assumed photographic scan line spacing, by the number of steps required to remove the overlap for the particular printer used or by an arbitrary amount that will remove the overlap for all printers. The next step 172 is to adjust the spacing ILIS between image line sets to change the phase relationship between the lenticules and the lenticule image line sets to compensate for the effective optical pitch. This is done by adjusting number of printer steps to the first scan line in the next image line set from the current position when the current position is the last scan line in the previously scanned image line set. If the number of image lines with a line image spacing IS is not integer divisible by the printer step width, the system adjusts 174 the line spacing to remove the accumulated error by the above discussed technique of rounding the ideal IS or by alternately increasing and decreasing ILIS by one step. The system then sends 176 the scan lines, each with the associated adjusted step count, to the printer. The printer using conventional stepper motor control technique steps between slow scan print head positions using the step count associated with each line. In a typical stepper motor controlled type printer, prior to stepping to a new or next scan line, a step count register is loaded with the step count for the number of steps to the next position. A synchronization pulse, related to the position of the print drum, causes the step count to be loaded into a counter which counts down at a predetermined clock rate producing pulses. Each down count pulse is supplied to a motor controller which moves the motor attached to the print head by one step for each pulse. When the count reaches zero the motor stops moving and a scan line is printed when the drum reaches the correct start position. Alternatively, a microprocessor in the printer emits the appropriate number of pulses corresponding to both the desired scan line spacing at each synchronizing pulse.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of producing a depth image, comprising the steps of:
   (a) producing image line sets where corresponding image lines in each of the sets corresponds to a different depth image view;
   (b) fixing the sets in a display media in alignment with lenticules of a lenticular overlay by continuously varying a spacing between the sets by scanning in a direction aligned with the lenticules; and
   (c) projecting the depth image to a viewer using the fixed image line sets.

2. A method as recited in claim 1, wherein step (b) includes creating the sets by modulated light spot scanning in parallel with long axes of the lenticules of the lenticular overlay.

3. A method as recited in claim 1, wherein step (b) includes fixing the sets at a lenticular pitch plus a variable phase relationship offset.

4. A method of producing a depth image, comprising the steps of:
   (a) producing image line sets where corresponding image lines in each of the sets corresponds to a different depth image view;
   (b) fixing the sets in a display media in alignment with lenticules of a lenticular overlay by scanning in a direction aligned with the lenticules, including fixing the sets at a lenticular pitch plus a variable phase relationship offset by determining the phase relationship by ray tracing; and
   (c) projecting the depth image to a viewer using the fixed image line sets.

5. A method of producing a depth image, comprising the steps of:
   (a) producing image line sets where corresponding image lines in each of the sets corresponds to a different depth image view;
   (b) fixing the sets in a display media in alignment with lenticules of a lenticular overlay by scanning in a direction aligned with the lenticules, including fixing the sets at a lenticular pitch plus a variable phase relationship offset by determining the phase relationship using test lines fixed in a depth image media; and
   (c) projecting the depth image to a viewer using the fixed image line sets.

6. A method as recited in claim 1, wherein step (b) includes varying a spacing of the line images within one of the sets.

7. A method as recited in claim 6, wherein step (b) includes varying a printer step spacing between image lines by rounding a noninteger step number up and down alternately.

8. A method as recited in claim 1, wherein the image lines comprise scan lines and step (b) includes varying a spacing of the scan lines of an image line to correct phase errors.

9. A method as recited in claim 7, wherein the varying is a fraction of a scan line spacing.

10. A method as recited in claim 1, wherein step (b) includes varying a printer step spacing between image line sets.

11. A method as recited in claim 10, wherein step (b) includes rounding a noninteger printer step number up and down alternately.

12. A method as recited in claim 1, wherein image lines comprise scan lines and step (b) includes duplicating scan lines.

13. A method as recited in claim 12, wherein said duplicating matches printer and lenticular pitches.

14. A method of producing a depth image, comprising the steps of:
   (a) producing the sets of image lines where corresponding image lines in each of the sets corresponds to a different depth image view;
   (b) continuously adjusting a phase relationship between the sets; and
   (c) projecting the depth image to a viewer using the phase adjusted sets.

15. A method as recited in claim 14, wherein the image lines each comprise a scan line and step (b) includes adjusting a center to center spacing of adjacent scan lines in adjacent image line sets.

16. A method as recited in claim 14, wherein each of the image lines comprises scan lines and step (b) includes adjusting a center to center spacing of the scan lines.

17. A method as recited in claim 14, wherein step (c) comprises:
   (c1) fixing the phase adjusted sets in a display media; and
   (c2) attaching a lenticular overlay to the display media.

18. A method as recited in claim 14, wherein step (a) includes the step of orienting the image lines in a direction parallel to long axes of lenticules of the overlay.

19. A method as recited in claim 14, wherein step (a) includes the step of orienting the image lines in a fast scan direction of a printing device.

20. A method of producing a depth image, comprising the steps of:
   (a) producing image lines where each image line corresponds to a different depth image view;
   (b) continuously adjusting a spacing between the image lines; and
   (c) projecting the depth image to a viewer using the space adjusted image lines.

21. A method of producing a depth image, comprising the steps of:
   (a) producing scan lines where each scan line corresponds to a different depth image view;
   (b) continuously adjusting a spacing between the scan lines; and
   (c) projecting the depth image to a viewer using the space adjusted scan lines.

22. A depth image apparatus, comprising:
   a lenticular overlay including lenticules;
   an image media confronting said lenticular overlay, lenticular images in said media comprising image line sets, the sets being aligned with the lenticules in a continuously varying phase relationship.

23. An apparatus as recited in claim 22, wherein said image liens are spaced apart preventing overlap of image line edges.

24. An apparatus as recited in claim 23, wherein the space varies correcting for a phase error.

25. An apparatus as recited in claim 22, wherein each of said image lines comprise scan lines and said scan lines have a space therebetween preventing overlap of scan line edges.

26. An apparatus as recited in claim 22, wherein said image lines are fixed on the media in an axial direction of the lenticules and in a fast scan direction of a printer.

27. A depth image creation apparatus, comprising:
   capture means for capturing views of a scene;
   output means for fixing a depth image in a media; and
   processing means for producing the depth image from the captured views, said processing means comprising:
      means for producing line image sets where each line image in a set corresponds to a slice of a different captured view; and
      means for variably and continuously adjusting a phase relationship between the sets to align the sets with a depth image projection media.

28. An apparatus as recited in claim 27, wherein said projection media comprises a lenticular overlay including lenticules and said means for variably adjusting adjusts the phase relationship between the lenticules and the sets.

29. An apparatus as recited in claim 27, wherein said processing means includes means for correcting a phase error in the phase relationship.

30. A method of producing a depth image, comprising:
   (a) computing an unequal spacing of image line sets in alignment with a subsequently placed depth image media;
   (b) writing the image line sets onto an optically planar image recording media; and
   (c) attaching the depth image media to the planar image recording media.

31. A method as recited in claim 30, wherein step (a) includes adjusting the spacing to account for viewpoint range.

32. A method as recited in claim 30, wherein step (b) includes scanning a modulated light spot on the media in parallel with long axes of lenticules of a lenticular overlay depth image media.

33. A method of producing a depth image, comprising:
   (a) computing a spacing between image line sets in alignment with a subsequently placed depth image media;
   (b) writing the image line sets onto an optically planar image recording media by scanning a modulated light spot over the media in alignment with long axes of lenticules of the overlay; and
   (c) attaching the depth image media to the planar image recording media.

* * * * *